F. W. PAWLING.
GLASS WORKING MACHINE.
APPLICATION FILED AUG. 7, 1913.

1,217,494.

Patented Feb. 27, 1917.
6 SHEETS—SHEET 1.

Witnesses
Frank A. Sahli
Josephine Gasper

Inventor
Francis W. Pawling
By Arthur M. Hood
Attorney

F. W. PAWLING.
GLASS WORKING MACHINE.
APPLICATION FILED AUG. 7, 1913.

1,217,494.  Patented Feb. 27, 1917.
6 SHEETS—SHEET 2.

Witnesses  Inventor
Frank A. Fahle  Francis W. Pawling,
Josephine Gasper  By Arthur M. Hood
 Attorney F. W. PAWLING.
GLASS WORKING MACHINE.
APPLICATION FILED AUG. 7, 1913.
1,217,494.
Patented Feb. 27, 1917.
6 SHEETS—SHEET 3.
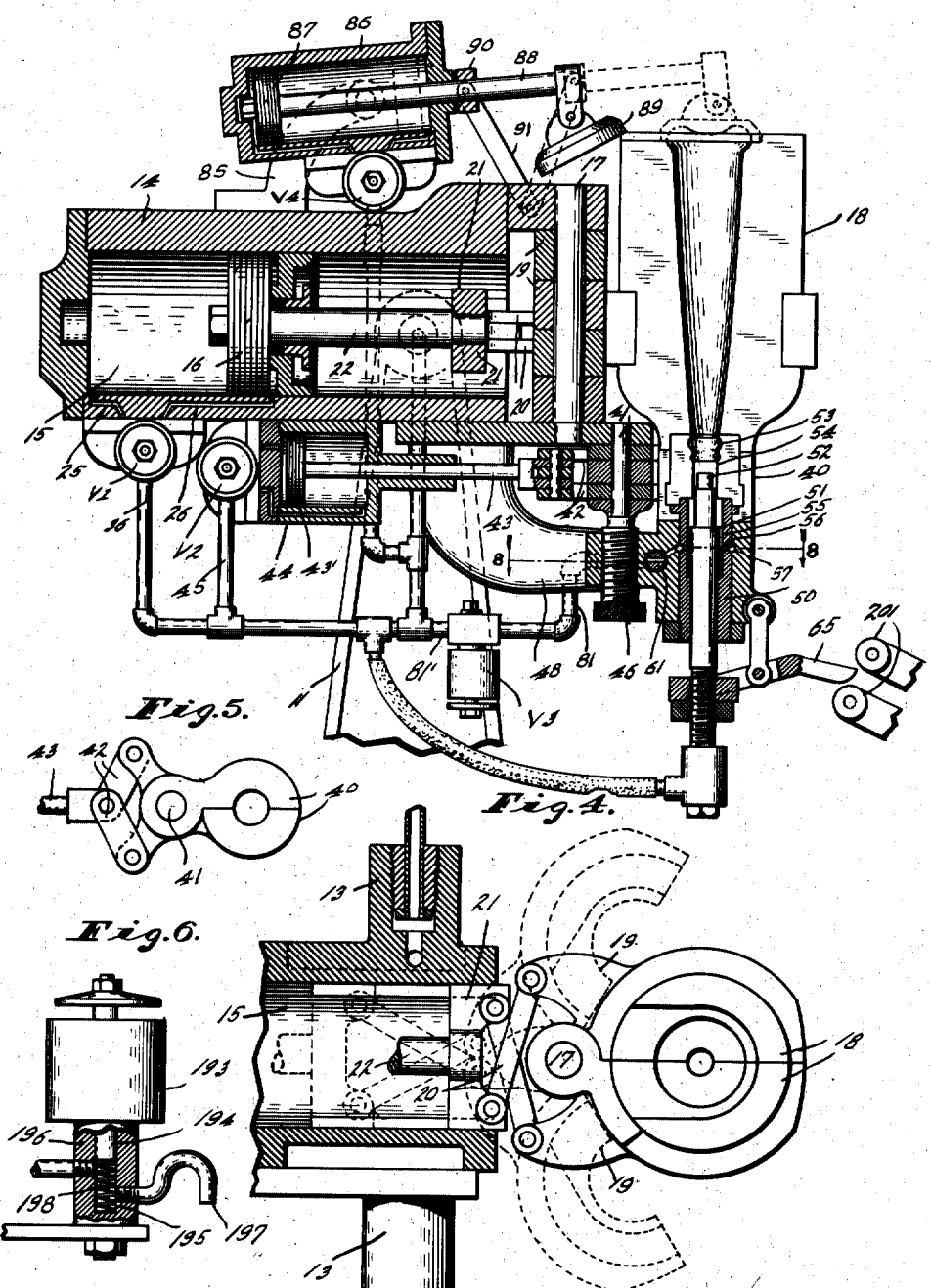
Witnesses:
Frank A. Fahle
Josephine Gasper
Inventor
Francis W. Pawling
By Arthur M. Hood
Attorney

F. W. PAWLING.
GLASS WORKING MACHINE.
APPLICATION FILED AUG. 7, 1913.

1,217,494.

Patented Feb. 27, 1917.
6 SHEETS—SHEET 4.

Witnesses
Frank A. Fahle
Josephine Gasper

Inventor
Francis W. Pawling,
By Arthur M. Hood
Attorney

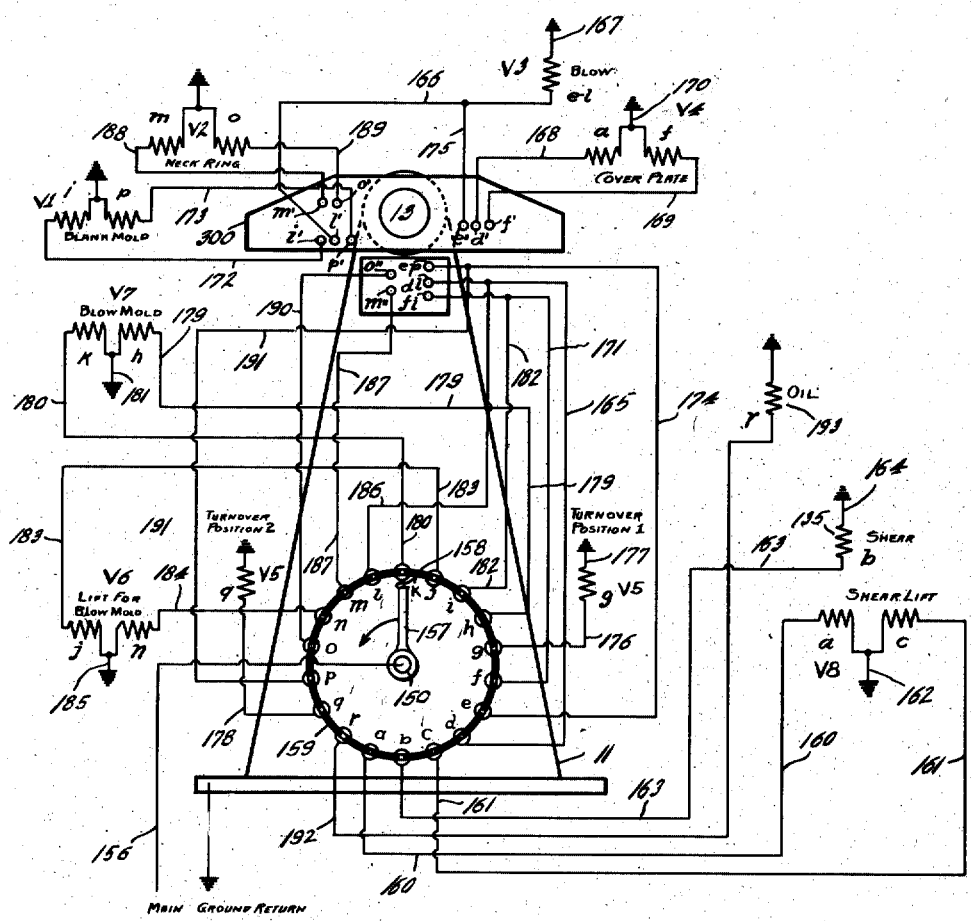
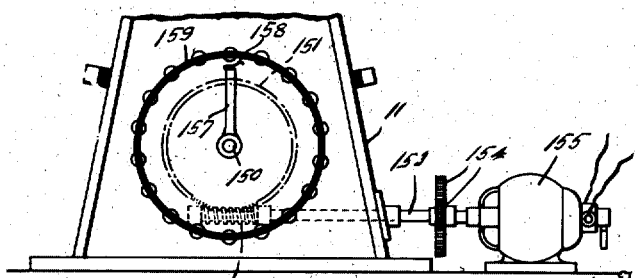

F. W. PAWLING.
GLASS WORKING MACHINE.
APPLICATION FILED AUG. 7, 1913.

1,217,494.

Patented Feb. 27, 1917.
6 SHEETS—SHEET 6.

Witnesses
Frank A. Fahle
Josephine Gasper

Inventor
Francis W. Pawling,
By Arthur M. Hood
Attorney

UNITED STATES PATENT OFFICE.

FRANCIS W. PAWLING, OF TERRE HAUTE, INDIANA, ASSIGNOR OF ONE-HALF TO TURNER BROTHERS COMPANY, OF TERRE HAUTE, INDIANA, A CORPORATION OF INDIANA.

GLASS-WORKING MACHINE.

1,217,494.   Specification of Letters Patent.   Patented Feb. 27, 1917.

Application filed August 7, 1913. Serial No. 783,502.

*To all whom it may concern:*

Be it known that I, FRANCIS W. PAWLING, a citizen of the United States, residing at Terre Haute, in the county of Vigo and State of Indiana, have invented a new and useful Glass-Working Machine, of which the following is a specification.

The object of my invention is to produce a compact and automatically operating machine by means of which molten glass, delivered to it, may be automatically cut, in desired quantities, from the supply, and be thereafter formed into a finished product.

Figure 1:
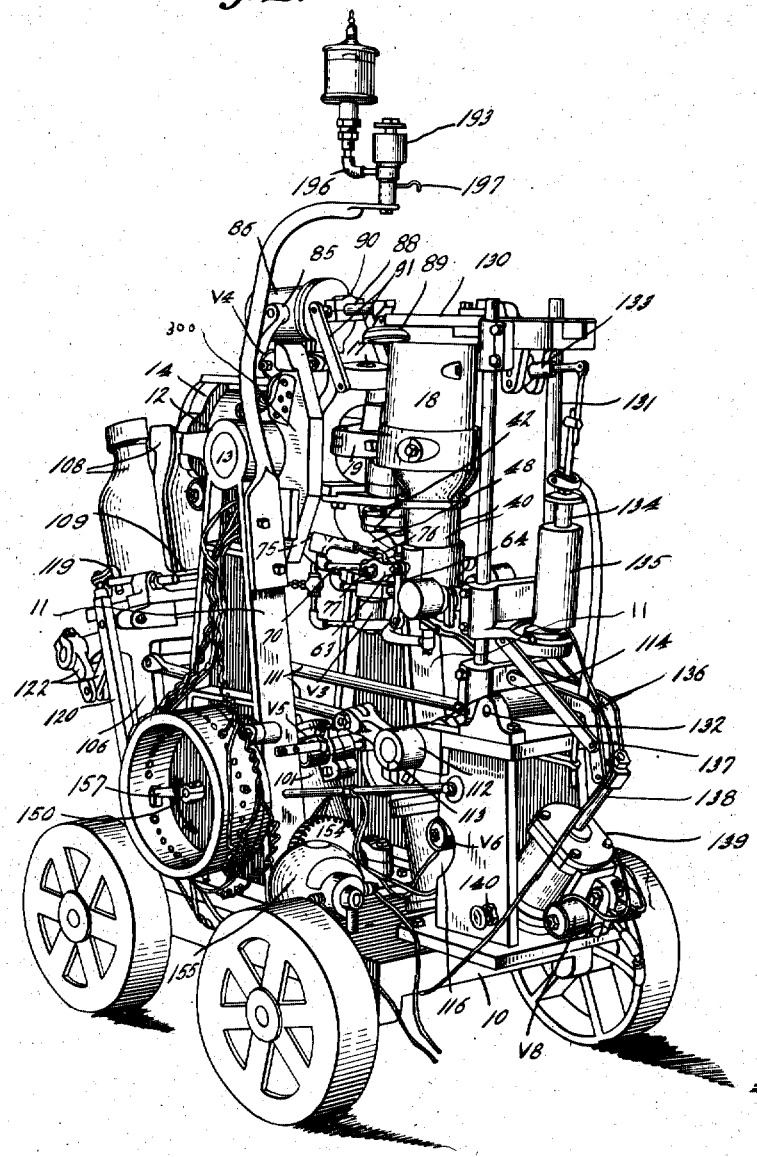
Figure 2:
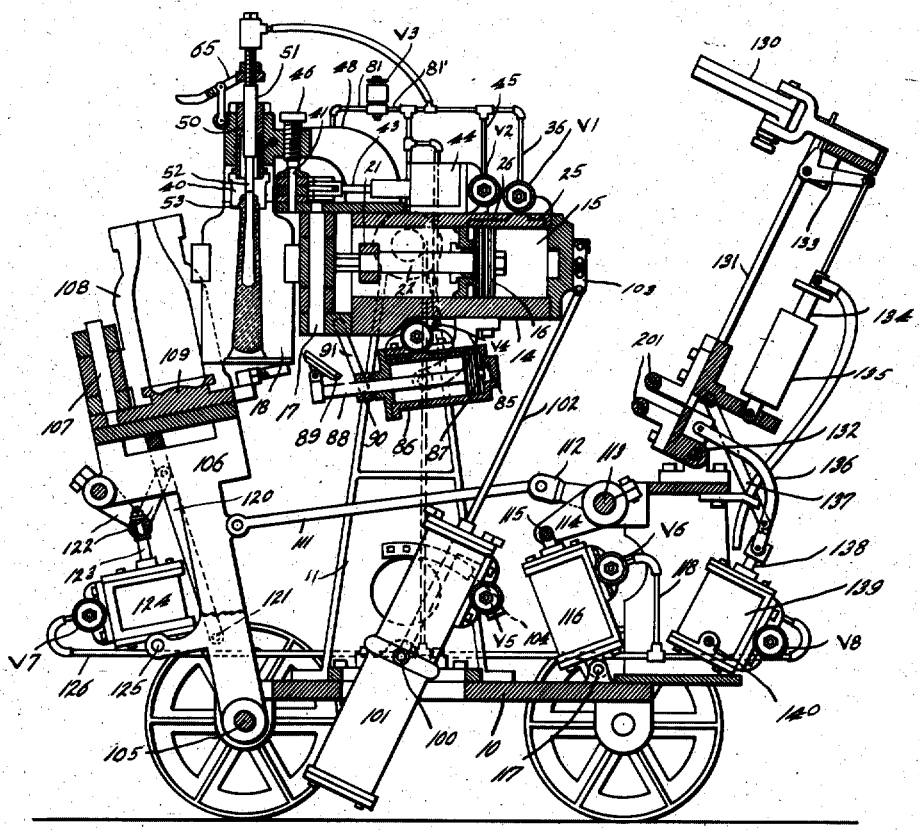
Figure 9:
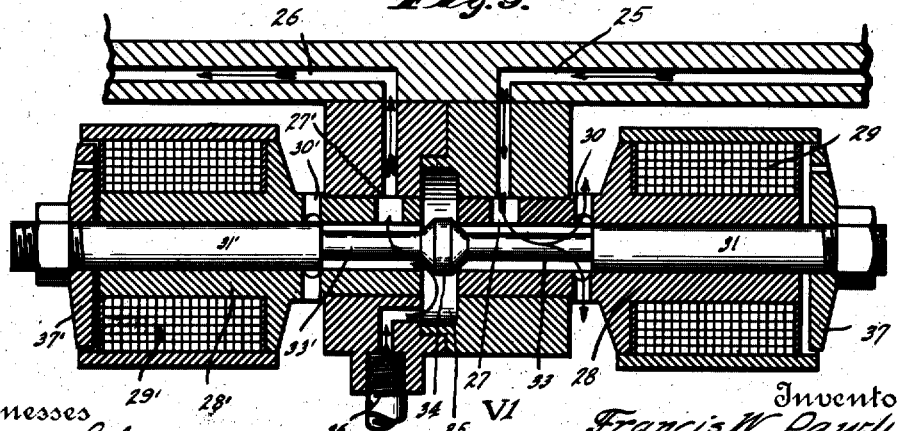
Figure 7:
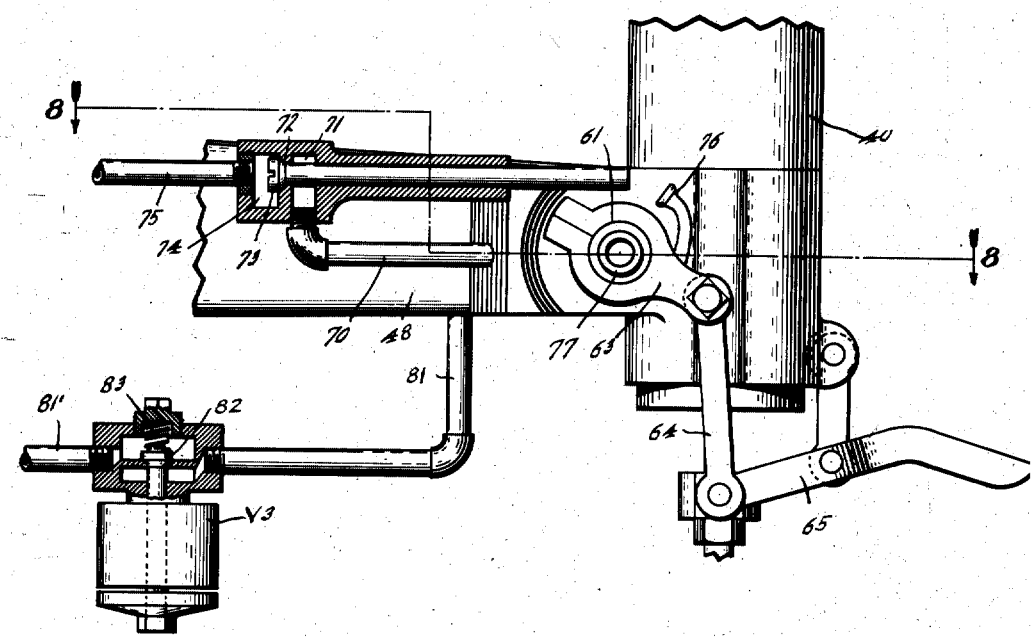
Figure 8:
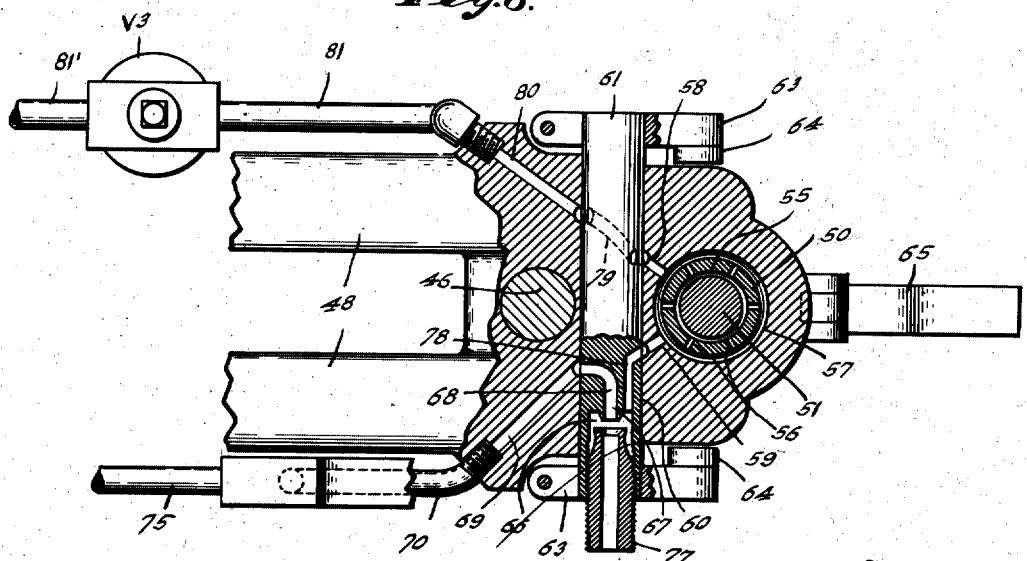
Figure 12:
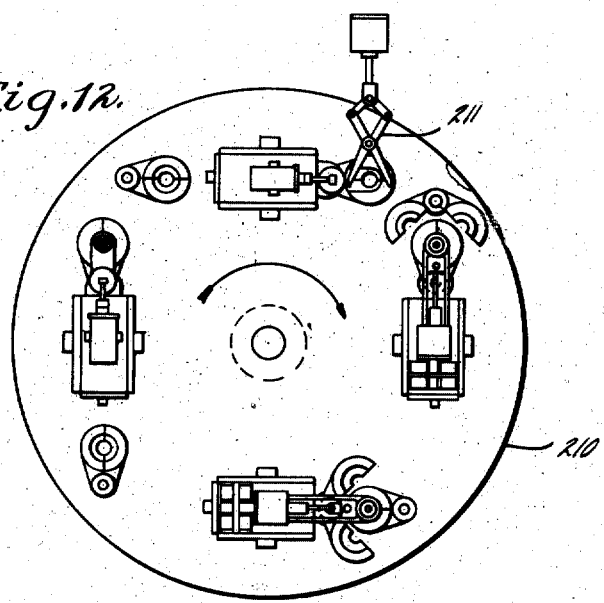
Figure 13:
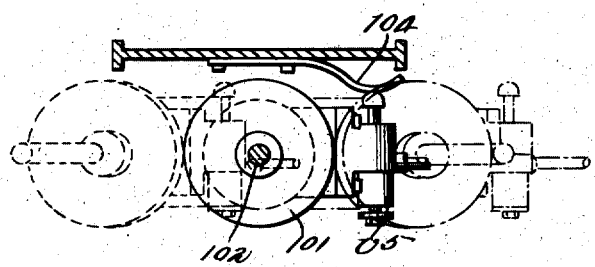

The accompanying drawings illustrate my invention. Figure 1 is a perspective view of one form of my improved machine comprising a single unit of coöperating parison mold and finishing mold; Fig. 2 is a central vertical section of the machine shown in Fig. 1, with the parts in the positions just preceding the delivery of a parison to the blow mold; Fig. 3 is a section, in the same plane as Fig. 2 but on a larger scale, of the parison mold and adjacent parts with the parison mold in glass-receiving position; Fig. 4 is a fragmentary section, at right angles to the plane of Fig. 3, showing the mating sections of the parison mold and the means for opening and closing the same; Fig. 5 is a detail of the mating members of the neck ring mold; Fig. 6 is an elevation in partial vertical section of the electrically-controlled oiling pump for delivering oil to the parison mold; Fig. 7 is an elevation in partial vertical section of the means for producing suction in the parison mold at the time of reception of the glass; Fig. 8 is a section on line 8—8 of Fig. 7, the plane of the section being also indicated by the line 8—8 in Fig. 3; Fig. 9 is a section of one of the solenoid-controlled air valves, several of which are used in the machine; Fig. 10 is a wiring diagram; Fig. 11 is a side elevation of the main electrical controller and its driving means; Fig. 12 is a plan showing an adaptation of my improvements by mounting several of the machines upon a horizontally rotatable table passing automatically beneath a single shearing mechanism, and Fig. 13 a horizontal section showing the relationship between cam 104 and valve V5.

In the drawings, 10 indicates a suitable supporting base carrying standards 11 each provided at its upper end with a bearing 12 formed to receive the trunnions 13 of the invertible parison mold carrier 14. The main body of carrier 14 is formed into a cylinder 15 within which is mounted a piston 16 and at right angles to the axis of cylinder 15 is a pin 17 upon which are hinged the mating members 18, 18 which form the parison mold. Each of these members 18 is provided with a rearwardly extending arm 19 to which is pivoted one end of a link 20 the opposite end being pivoted to a cross head 21 carried by the piston rod 22 which in turn is carried by the piston 16, the arrangement being such that reciprocation of the piston 16 will automatically open and close the mating members of the parison mold around pin 17 as an axis. The passage of motive fluid (compressed air conveniently) to and from the opposite ends of cylinder 16 takes place through ports 25 and 26, each of which serves both as an inlet and exhaust passage. Passage 25 communicates with a passage 27 formed through the tubular bobbin or holder 28 of a solenoid coil 29 and leading from the interior of this tubular bobbin to the atmosphere are exhaust ports 30. One end of the tubular bobbin 28 is filled by the core 31 said core being of sufficient length to at times close the ports 30. The core 31 is ensmalled at 33 to afford a free passage at times between ports 27 and 30 and is provided with a valve 34 adapted to close the adjacent end of the tubular bobbin at times when the ports 30 are open.

Similarly the passage 26 communicates with a port 27' formed through the tubular bobbin 28' of the solenoid coil 29'. This bobbin is provided with exhaust ports 30' arranged to be opened and closed by the core 31' of the solenoid said core being ensmalled at 33'.

The valve 34 reciprocates within a chamber 35 into which leads an air supply pipe 36. The core 31—31' is provided at its opposite ends with heads 37 of magnetic material suitable to be operated upon by a current traversing the coils 29, 29', the arrangement being such that current passing through coil 29 will shift valve 34 so as to close communication between chamber 35 and passage 27'; so as to open communication between chamber 35 and passage 27; so as to close passages 30 and so as to open passages 30'; and also such that current passing through coil 29' will reverse the conditions above outlined, thereby admitting air to passage 25 when it is allowed to escape from passage 26 and admitting air to passage 26 when it is allowed to escape from passage 25.

The valve above described, as used for opening and closing the passages to cylinder 15, is designated as V1.

Coöperating with the mating members of the parison mold are the mating members 40, 40 of the neck ring mold which are pivoted upon the pivot pin 41 which is parallel to pin 17, and are swung by means of links 42, 42 and a piston rod 43 carried by a piston 43' within a cylinder 44 which is mounted on or forms a part of the parison mold carrier 14. Flow of air to and from the cylinder 44 is controlled by a solenoid-operated valve V2 similar to the valve V1, air being received through the supply pipe 45. For convenience in assembling and dissociating the parts, I have found it convenient to carry the pivot pin 41 upon the end of a threaded rod 46 which is threaded through a bracket 48 mounted upon or forming a part of the parison mold carrier 14.

Coöperating with the neck ring mold sections, and in alinement therewith, is a tube 50 through which is reciprocably mounted a pin 51 which, at its inner end, is provided with a tip 52 which is adapted to enter the neck-forming pocket 53 of the neck ring mold in such manner as to permit the glass to flow around the pin to form the neck of the completed article. The passage 54 which leads through the neck ring mold from the pocket 53 is slightly larger than the portion of pin 51 which lies therein, the difference in diameter being sufficient to permit fairly free passage of air but not sufficient to permit passage of molten glass. The portion 55 of the interior of tube 51 is somewhat larger than the pin 50 and the walls of this portion are perforated at 56 communicating with an annular passage 57 with which communicate two passages 58 and 59 both of which lead to a transverse passage 60 within which is journaled a valve pin 61. Secured to the valve pin 61 are arms 63 connected by links 64 with a lever 65 by means of which the valve pin is oscillated, as will be made to appear. Pin 61 at one end is chambered, as indicated at 66 (Fig. 8) and at the bottom of this chamber is formed a nipple 67 through which extends a passage 68 which may be brought intermittently into registry with an air supply passage 69 which communicates with a pipe 70. Pipe 70, leads from a chamber 71 which receives its supply of air through a valve seat 72 controlled by a valve 73 the head of said valve lying in a supply chamber 74 into which delivers a supply pipe 75. Valve 73 is normally closed, by the pressure acting upon the head thereof, and is intermittently opened by finger 76 carried by arm 63. The nipple 67 is directed toward but lies a short distance from an aspirator nozzle 77 and leading into chamber 66 behind nipple 67 is a passage 78 which at times registers with passage 59, the arrangement being such that compressed air flowing through passages 69 and 68 will pass through chamber 66 into the aspirator nozzle 77 and thereby create a vacuum in chamber 66 which serves to draw the air from the neck ring mold through passages 56, 57, 59 and 78 and thus create a vacuum in pocket 53 at the time of deposit of the molten glass into the parison mold. Running through pin 61 is a passage 79 which at times connects passage 58 with a passage 80 which, in turn, receives a supply of air from pipe 81 through a valve V3 which comprises a solenoid coil, a valve head 82 carried by the core and normally held closed by a spring 83 and the air pressure, said valve head controlling the communication between the pipe 81 and the supply pipe 81'.

Pivotally mounted upon brackets 85 carried by the carrier 14 is a cylinder 86 within which is mounted a piston 87, said piston being provided with a rod 88 which at its end carries a pivoted cover plate 89. Piston rod 88 carries a collar 90 to which is pivoted one end of a link 91, the opposite end being pivoted upon the carrier 14 so that, as the piston is reciprocated from the position shown in full lines in Fig. 3 to the position shown in dotted lines in that figure, the cover plate 89 will be carried over and deposited upon the upper open end of the parison mold, as indicated in dotted lines in Fig. 3. Passage of air or other motive fluid to and from the cylinder 86 is controlled by a valve V4 like the valve V1.

As previously stated, the carrier 14 is provided with trunnions 13 which are journaled in the bearings 12 of standards 11 and I provide the following mechanism for inverting the carrier so that the parison mold may be first presented with its bottom end upward to receive the molten glass and may then be inverted, as shown in Fig. 2, so that the parison may be delivered to the blow mold:—Mounted upon suitable horizontal trunnions 100 is a cylinder 101 in which is mounted a piston carrying a rod 102 connected by the flexible links 103 with one end of carrier 14, the arrangement being such that reciprocation of the rod 102 will cause oscillation of the carrier 14 and produce oscillation of the cylinder 101. Flow of air to and from the cylinder 101 is controlled by a valve V5 which is similar to one-half of the valve V1. This valve is mechanically operated into its exhausting position by engagement with a cam 104 which operates upon it as the cylinder 101 oscillates.

Pivoted at 105 on the carrier 10 is a swinging mold support 106 which carries a pivot pin 107 upon which the mating halves 108, 108 of the blow mold are hinged, said blow mold sections coöperating with a bottom mold 109 mounted on the carrier 106. In order to intermittently swing the carrier 106 to bring the blow mold into and out of alinement with the parison, I attach links 111 which are also connected to arms 112 carried by a rock shaft 113. Rock shaft 113 carries an arm 114 which is pivoted to the end of a piston rod 115 carried by a piston within an oscillating cylinder 116 pivoted at 117 upon the carrier 10. Flow of air to and from the cylinder 116. is controlled by a valve V6 similar to valve V1 and receiving it supply of air through a pipe 118.

The sections 108, 108 of the blow mold are opened and closed by links 119 carried by levers 120 pivoted at 121 on carrier 106, the said levers being moved by a toggle comprising the links 122, 122 to the joint or knuckle of which is connected the piston rod 123 carried by a piston within the cylinder 124 which is pivoted at 125 upon the carrier 106. Flow of air to and from cylinder 124 is controlled by a valve V7 like valve V1 and receiving its air from pipe 126.

The apparatus just described may be provided with glass in any desired manner and in Figs. 1 and 2, I show an automatically operating shearing mechanism for cutting glass from a punty stream. In this form the shears 130 are carried by a swinging carrier 131 pivoted at 132 on the main support 10. The details of this construction are not material to the present invention and it is considered sufficient to say that the shears 130 are intermittently operated by a lever 133 acted on by the solenoid core 134 arranged within the coil 135. The carrier 131 is connected by links 136 and 137 with a piston rod 138 carried by a piston within a cylinder 139 pivoted at 140 on the carrier 10. Flow of air to and from cylinder 139 is controlled by a valve V8 which is like valve V1.

The various movements of the mechanism are controlled by the movement of the controller shaft 150 (Fig. 10) which is constantly rotated by means of a gear 151 (Fig. 11) worm 152, shaft 153, gearing 154 and a small motor 155. Shaft 150 is insulated from the main body of the machine and is connected to a main supply wire 156 by a suitable brush connection. The shaft carries a terminal arm 157 provided with a suitable brush terminal 158 which is adapted to engage successively the concentric series of terminals a, b, c, d, e, f, g, h, i, j, k, l, m, n, o, p, q, and r which are carried by the insulating ring carrier 159 and are preferably so formed as to be angularly adjustable. In the diagram of Fig. 10 I have for convenience shown these various terminals as equally spaced but it will be readily understood that the actual spacing will vary, dependent upon the relative time relationship between the successive movements desired. This adjustment may be obtained by providing slotted openings for the terminals, or by providing a large number of closely arranged openings, or in any other well known manner to obtain the desired result, the arrangement being such that one turn of shaft 150 produces one complete cycle of operation of the machine.

Terminal $a$ is connected by wire 160 with one coil of valve V8 while the other coil of that valve is connected by wire 161 with terminal $c$, the two coils being grounded at 162. Terminal $b$ is connected by a wire 163 with coil 135 the opposite end of said coil being grounded at 164. Terminal $d$ is connected by a wire 165 to a terminal $dl$ on one of the standards 11 which is so arranged as to be alternately engaged by the terminals $d'$ and $l'$, on the oscillating carrier 300. Terminal $l'$ is connected by a wire 166 with the coil of valve V3 the other end of said coil being grounded at 167. Terminal $d'$ is connected by a wire 168 with one coil of the cover controlling valve V4 the other coil being connected by a wire 169 with terminal $f'$ on the carrier 300 and the two coils being grounded at 170. Terminal $f$ is connected by a wire 171 with a terminal $fi$ on the standard 11 and the terminal $f'$ on the carrier 300 is connected by a wire 172 to one coil of valve V1 the other coil being connected by a wire 173 with the terminal $p'$ on the carrier 300. Terminal $e$ is connected by a wire 174 with a terminal $ep$ on standard 11 and terminal $e'$ on carrier 300 is connected by a wire 175 to a wire 166 which is connected to the coil of valve V3. Terminal $g$ is connected by a wire 176 with the coil of valve V5 which is grounded as indicated at 177. For convenience in illustration, the coil of this valve V5 is shown in two positions in diagram (Fig. 10) to-wit, turn-over position 1 and turn-over position 2 and this coil is therefore connected by a wire 178 with terminal $q$. Terminal $h$ is connected by a wire 179 with one of the coils of valve V7 the other coil being connected by a wire 180 with terminal $k$ and the two coils being grounded as indicated at 181. Terminal $i$ is connected by a wire 182 with the terminal $fi$. Terminal $j$ is connected by a wire 183 to one of the coils V6 the other coil being connected by a wire 184 with terminal $n$ and the two coils being grounded as indicated at 185. Terminal $l$ is connected by a wire 186 with the terminal $dl$ on standard 11. Terminal $m$ is connected by a wire 187 with terminal $m''$ on standard 11 and terminal $m'$ on carrier 300 is connected by a wire 188 with one of the coils of valve V2 the other coil being connected by a wire 189 with terminal $o'$ on carrier 300. Terminal $o''$ on standard 11 is connected by a wire 190 with terminal $o$. Terminal $p$ is connected by a wire 191 with terminal ep. Terminal r is connected by a wire 192 with the coil of a solenoid pump 193 the core 194 of which lies within a cylinder 195 into which oil is delivered through a pipe 196 and delivered through a pipe 197, a spring 198 being provided to normally hold the core 194 up above the delivery end of pipe 196 so that oil may flow into the cylinder 195, the arrangement being such that pipe 197 is directed toward the open upper end of the parison mold and a small quantity of oil delivered into the mold just before it receives its charge of glass.

Assuming the shaft 150 to be rotated in the direction indicated by the arrow and the brush 158 to be just going into contact with terminal $a$, the cycle of operation is as follows:

In this assumed position the carrier 300 will be in the position indicated in Fig. 1 and at that time terminals $e'$, $d'$ and $f'$ will be in contact with the terminals $ep$, $dl$, and $fi$, respectively; the parison mold and neck ring mold will be in closed position; the shear will be in the position shown in Fig. 2 and the blow mold in the position shown in Figs. 1 and 2. The contact between brush 158 and terminal $a$ will close the circuit through wire 160 and that coil of valve V8 which will cause an upward or expelling movement of piston rod 138 which, acting through links 136 and 137 will swing the shear carrier 131 into the position shown in Fig. 1 with the shear blades lying over the upper end of the blank mold. This movement of the shear carrier 131 brings fingers 201 into engagement with lever 65 so as to swing the valve pin 162 and cause finger 76 to engage valve 73 and allow a flow of air through pipes 75 and 70 and passages 69 and 68 through the aspirator nozzle 77 so as to produce a suction in the neck mold. This movement of lever 65 also throws the plunger 51 upwardly to bring its tip 52 into the pocket 53 of the neck mold. Thereupon glass is deposited in the blank mold and will be sucked downwardly so as to form a proper neck in the neck mold around the tip 52. Advance of arm 57 brings brush 158 into contact with terminal $b$ which closes the circuit through wire 163 and coil 135 so as to actuate the shear and cut the glass from the supply. Thereupon terminal $c$ is engaged, closing the circuit through wire 161 and one coil of valve V8 so as to throw the shear back to the position shown in Fig. 2 and withdraw plunger 50, cut off the suction, and register passage 79 with passages 80 and 58. Contact with terminal $d$ closes the circuit through wire 165, terminal $dl$, terminal $d'$ and wire 168 to one coil of valve V4 which thus admits air to the left hand end of cylinder 86 (Fig. 3) so as to move the cover 89 over the upper end of the parison mold. Thereupon contact with terminal $e$ closes circuit through wire 174, terminal $ep$, terminal $e'$, wire 175, part of wire 166 and the coil of valve V3 so as to admit a small quantity of air through pipe 81 and passages 80, 79 and 58 into the cavity in the parison formed by the withdrawal of the tip 52 when the shear carrier is thrown back to its normal position shown in Fig. 2. This preliminary blowing of the blank is accomplished very quickly, the terminal $e$ being quite short circumferentially. Thereafter contact with terminal $f$ closes circuit through wire 171, terminal $fi$, terminal $f'$, and wire 169 to the other coil of valve V4 thus causing a withdrawal of cover 89. Contact with terminal $g$ closes circuit through wire 176 to the coil of valve V5 thus admitting air into the upper end of cylinder 101 causing a reversal of the carrier 14 to the position shown in Fig. 2. As the cylinder 101 passes over the vertical center, about the axis 100, valve V5 is mechanically operated by the cam 104 so as to permit the air to exhaust from the cylinder as the oscillating movement of the carrier 14 is completed, due to the slight preponderance of weight on the mold side of the trunnions 13. This inversion of carrier 14 carries terminal $e'$, $d'$, and $f'$ out of contact with terminals $ep$, $dl$, and $fi$ and brings terminals $p'$, $l'$ and $i'$ into contact with the terminals $ep$, $dl$, and $fi$, respectively, and also brings terminals $o'$ and $m'$ into contact with terminals $o''$, $m''$, respectively. Thereupon contact with terminal $h$ closes circuit through wire 179 and one of the coils of valve V7 so as to operate through cylinder 124, piston rod 123 and the associated parts, to open the blow mold 108 so as to permit the withdrawal of the completed article which is therein. Thereupon contact with terminal $i$ closes circuit through wire 182, terminal $fi$, terminal $i'$, and wire 172 through one coil of valve V1 so as to cause an actuation of piston 16 to open the sections of the parison mold 18 and thus expose the parison suspended from the neck mold which remains closed. Thereupon terminal $j$ is contacted closing the circuit through wire 183 and one coil of valve V6 so as to act through cylinder 116 and the associated parts to swing the carrier 106 to the right (Fig. 2) and bring the blow mold into alinement with the parison. Thereupon contact with terminal $k$ closes circuit through wire 180 and one coil of valve V7 to close the blow mold around the parison. Thereupon contact with terminal $l$ closes circuit through wire 186, terminal $dl$, terminal $l'$, and wire 166 to actuate valve V3 and admit the air through pipe 81 and passages 80, 79 and 58 into the cavity of the neck ring and the cavity of the parison so as to expand the parison into the blow mold.

Thereupon contact with terminal n' closes circuit through wire 187, terminal m'', terminal m' and wire 188 through one coil of valve V2 so as to cause an actuation of piston 43 to open the neck mold and release the completed article so that, when contact is made with terminal n to close circuit through wire 184 and one coil of valve V6, the cylinder 116 and associated parts, acting to swing carrier 106 back to its normal position, will permit the completed article to be carried away in the blow mold. Thereupon contact with terminal o closes circuit through wire 190, terminal o'', terminal o', wire 189 and one coil of valve V2 to close the neck mold. The brush 158 then moves into contact with terminal p which closes circuit through wire 191, terminal ep, terminal p', wire 173 and one coil of valve V2 to actuate piston 16 and cause the blank mold 18 to close. Brush 158 then moves into contact with terminal q thus closing the circuit through wire 178 and the coil of valve V5 so as to cause an actuation of cylinder 101 and associated parts to swing carrier 14 back to its normal position, valve V5 again contacting with the cam 104, during the swinging of the cylinder 101, so as to exhaust the air from the cylinder during the final portion of the return movement of carrier 14. This brings the parts back to the starting position and a contact with terminal r causes an actuation of the oil-squirting pump 194 in the manner already described.

It will be readily understood that the unit, comprising the blank mold, the neck mold, the blow mold and the associated parts, may be very readily duplicated or arranged in multiple in such manner as to be brought successively to a single filling position. For instance, I have shown in Fig. 12 a plan, diagrammatically, of such an arrangement mounted upon a horizontally rotatable table 210 and capable of passing the parison molds in their receiving positions successively beneath a shearing mechanism 211 which may, if desired, be of such form as is now commonly used for operation upon a stream of glass flowing continuously to the cutting mechanism.

I claim as my invention:

1. In a glass working machine, the combination, with a carrier having a cylinder formed therein and invertible about an axis at right angles to the axis of the cylinder, of an invertible mold mounted on said carrier and comprising a movable member pivoted on an axis substantially parallel with the mold axis and at right angles to the cylinder axis, a piston in said cylinder movable toward and from the mold axis, and connections between the piston and the movable mold member.

2. In a glass working machine, the combination, with an invertible carrier having a cylinder formed therein, of a mold mounted on said carrier and comprising a movable member, a piston in said cylinder, connections between the piston and the movable mold member, a horizontal pivotal mounting for said carrier at right angles to the axes of the cylinder and mold, and means for swinging said carrier on its mounting to invert and revert the mold.

3. In a glass working machine, the combination, with an invertible carrier having a cylinder formed therein, of a mold mounted on said carrier and comprising a movable member, a piston in said cylinder, connections between the piston and the movable mold member, a horizontal pivotal mounting for said carrier at right angles to the axes of the cylinder and mold, and means for swinging said carrier on its mounting to invert and revert the mold, said means comprising a cylinder and piston.

4. In a glass working machine, the combination, with a carrier having a cylinder formed therein, of a mold mounted on said carrier and comprising a movable member, a piston in said cylinder, connections between the piston and the movable mold member, an electrically controlled valve for controlling the flow of motive fluid to and from said cylinder, a horizontal pivotal mounting for said carrier, and means for swinging said carrier on its mounting, said means comprising a cylinder and piston, an electrically-controlled valve for controlling the flow of motive fluid to said last-mentioned cylinder, and a cam operating to shift said valve to exhaust position upon movement of the cylinder.

5. In a glass working machine, the combination, with a carrier having a substantially horizontal pivotal mounting, of a mold carried by said carrier, means on the carrier for opening and closing the mold, an electrically-controlled member for controlling the operation for said means, a second mold, means for opening and closing said mold, an electrically-controlled member for controlling said last-mentioned mold-operating means, means for moving the second mold toward and from registry with the first mold in one of its positions, an electrically-controlled member for controlling said last-mentioned means, a controller successively controlling actuation of the several driving mechanisms, said controller comprising a plurality of electric terminals and a contact arm arranged for relative movement and successive coaction and circuits connecting the same with the several electrically controlled members, and a motor for causing said relative movement.

6. In a glass working machine, the combination of a parison mold, a blow mold, means for shifting said molds, said means comprising cylinders and coöperating pistons for motive fluid, electric controllers for said shifting means comprising electrically-operated valves, a main controller comprising circuits controlling the first-mentioned controllers and also comprising a movable member successively engaging said circuits, and a motor for driving said movable member.

7. In a glass working machine, the combination of a parison mold, a blow mold, means for shifting said molds, electric controllers for said shifting means, a main controller comprising circuits controlling the first-mentioned controllers and also comprising a movable member successively engaging said circuits, and a motor for driving said movable member.

8. In a glass working machine, an invertible mold carrier comprising a cylinder and piston, an open-ended mold mounted thereon and comprising a movable member connected to said piston, a cylinder and piston pivotally mounted on said carrier, a link pivoted to the carrier and the last-mentioned piston, and a cover for the mold carried by said last-mentioned piston.

9. In a glass working machine, an invertible mold carrier, an open-ended mold mounted thereon and comprising a movable member, a cylinder and piston pivotally mounted on said carrier, a link pivoted to the carrier and the piston, and a cover for the mold carried by said piston.

10. In a glass working machine, an invertible mold carrier comprising a cylinder and piston, an open-ended mold mounted thereon and comprising a movable member connected to said piston, a cylinder and piston mounted on said carrier, and a cover for the mold carried by said last-mentioned piston.

11. In a glass working machine, an invertible mold carrier, an open-ended mold mounted thereon and comprising a movable member, a cylinder and piston mounted on said carrier so as to partake of its inverting movement, and a cover for the mold carried by said piston.

12. In a glass working machine, the combination with a mold comprising a movable member movable toward and from its fellow, a carrier for supporting said mold in substantially vertical position, a pivotal mounting for said carrier substantially at right angles to the axis of the mold, a cylinder formed in said carrier substantially at right angles to the pivotal mounting of the carrier and to the axis of the mold, a piston mounted in said cylinder, connections between said piston and the movable member of the mold, a second cylinder pivoted upon an axis substantially parallel to the axis of the carrier, a piston mounted in said cylinder, and a connection between said piston and the first carrier to one side of the carrier axis whereby complete reciprocation of said last-mentioned piston will produce a mold inverting or reverting oscillation of the carrier.

13. In a glass working machine, the combination of a pivoted mold carrier, an operating cylinder therefor pivoted upon an axis substantially parallel with the axis of the carrier, a piston mounted in said cylinder, and connections between said piston and carrier to one side of the axis of the carrier whereby complete reciprocation of the piston will produce a half revolution of the carrier.

14. In a glass working machine, the combination of a mold carrier having a pivotal support, a cylinder formed in said carrier at right angles to the pivotal support, a mold comprising two hinged mating members mounted upon the carrier with its hinge axis at right angles to the cylinder and carrier axis, a piston mounted in said cylinder, and links connecting said piston and both mold members whereby reciprocation of the piston will open and close the mold members.

In witness whereof, I have hereunto set my hand at Indianapolis, Indiana, this 1st day of August, A. D. one thousand nine hundred and thirteen.

FRANCIS W. PAWLING.

Witnesses:
ARTHUR M. HOOD,
FRANK A. FAHLE.